June 7, 1966   H. E. THOMASON   3,254,702
HEAT (OR COLD) STORAGE APPARATUS
Filed Aug. 25, 1959   2 Sheets-Sheet 2
Fig. 3.
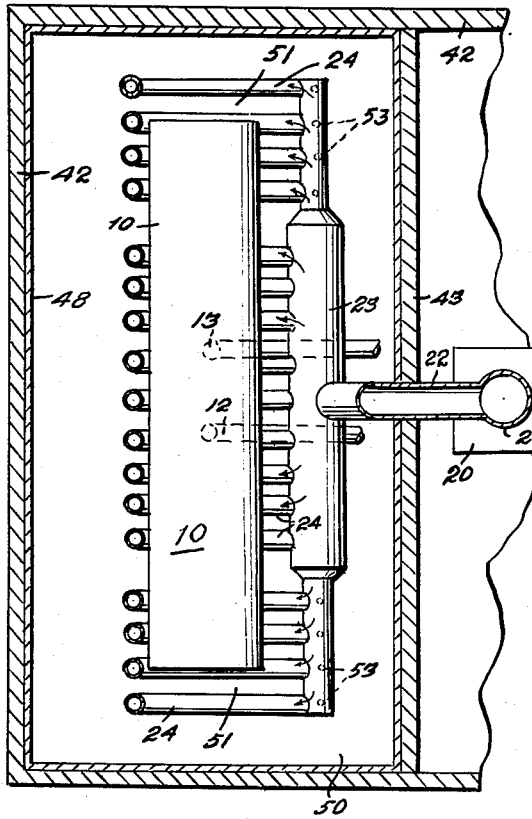
Fig. 4.
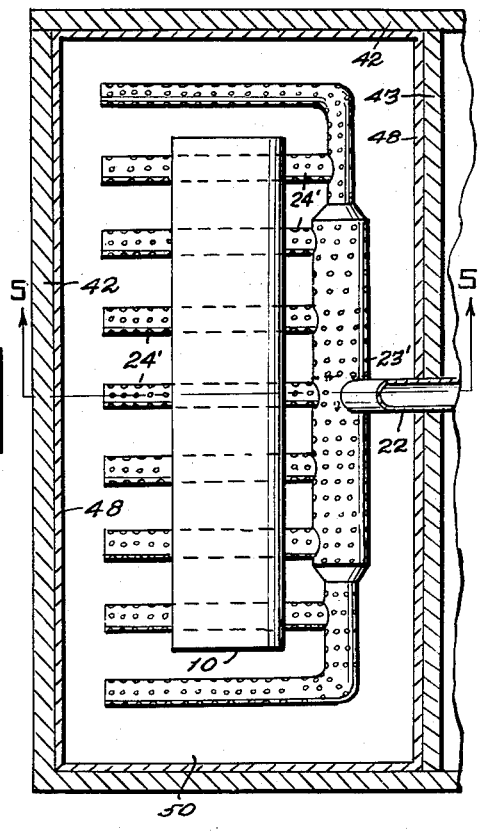
Fig. 5.
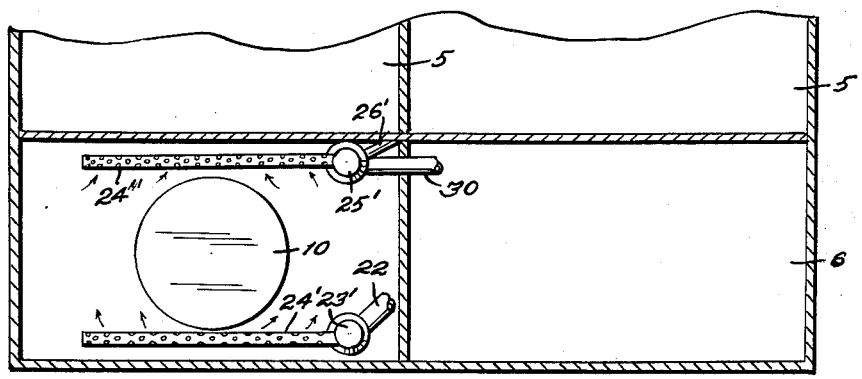
Fig. 7.
INVENTOR.
Harry E. Thomason

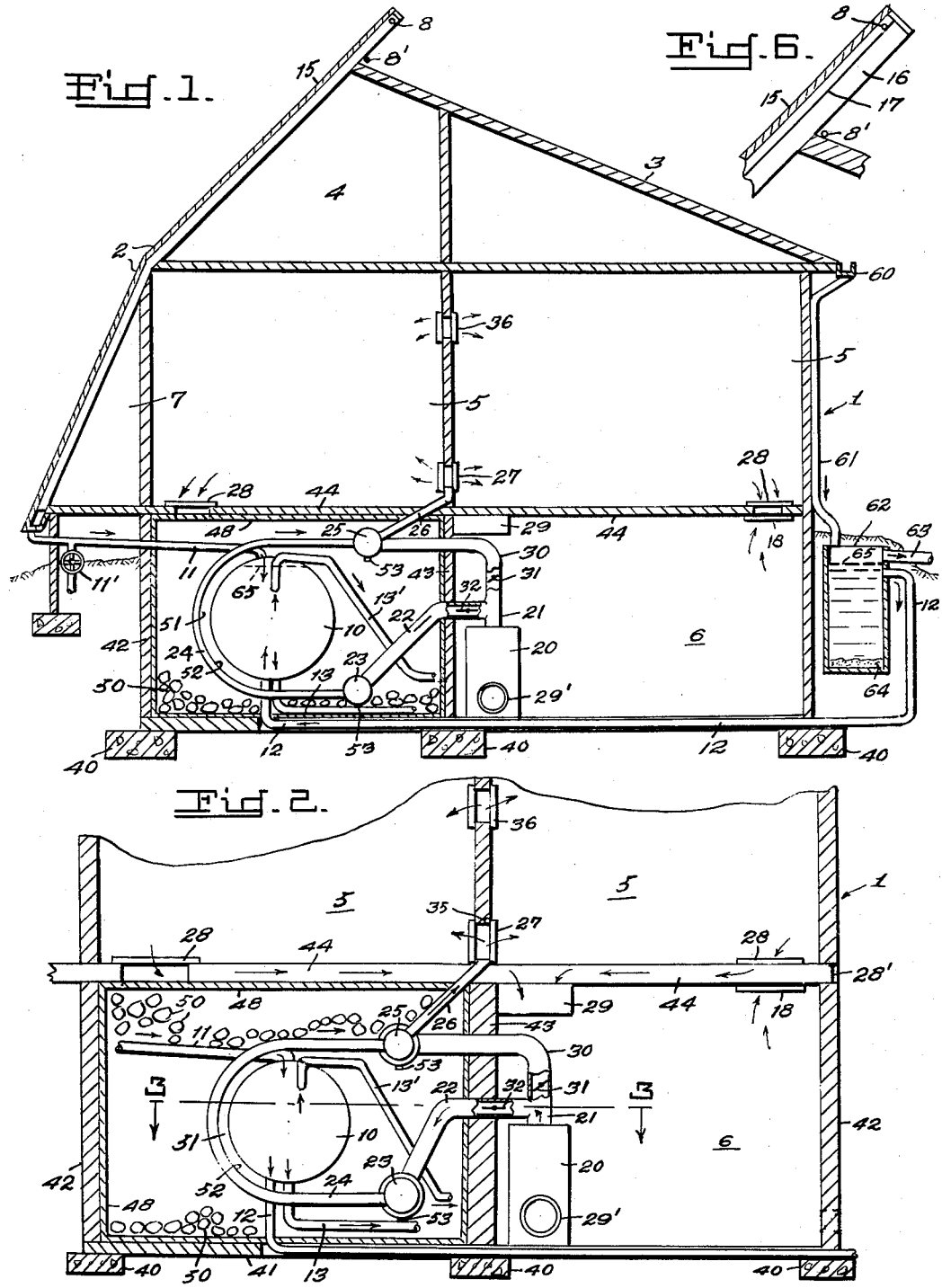

United States Patent Office 3,254,702
Patented June 7, 1966

3,254,702
HEAT (OR COLD) STORAGE APPARATUS
Harry E. Thomason, 6911 Walker Mill Road SE.,
Washington, D.C.
Filed Aug. 25, 1959, Ser. No. 835,962
15 Claims. (Cl. 165—48)

The present invention relates to storage of heat, or "storage of cold," for use hours or days later. The problem arises in circumstances such as in connection with heating or cooling buildings, particularly where such heating is done by solar heat, and such cooling is done by radiating and evaporating heat dissipators. Obviously heat storage is important in many other instances, but the above conditions will be used as exemplary.

As a pre-requisite to economical use of solar energy for heating, it is necessary to provide a low-cost, highly efficient, and trouble-free solar heat collector to trap solar insolation in the form of heat. Additionally, it is necessary to provide low-cost, trouble-free, and effective heat storage means to hold the heat which has been trapped by the heat collector. Then, it is necessary to provide a simple, low-cost, and trouble-free means for getting the heat back out of the heat storage means in controlled quantities and to the place of desired use. Further, it is desirable that the heating system be capable of reversable operation so as to dispose of heat during hot days, thereby yielding greater value from the system and making it of greater economic value, since the system is then usable the year around.

In my Patent No. 3,145,707 and application S.N. 391,-816, filed August 24, 1964, I have disclosed a low-cost, highly efficient, simple and trouble-free solar heat collector. In Patent 3,254,701, filed April 8, 1959, I have disclosed a very simple and inexpensive combination solar heat collector and heat dissipator which is very efficient and trouble-free for cooling. Now, the present invention discloses heat (or cold) storage means which is usable together with the aforementioned solar heat collector and the cooling mechanism. The three inventions, when used together, form a system usable, for example, to heat a home by solar heat in winter, including nights and a series of cloudy days, and to air-condition it in summer. The entire system uses low-cost permanent type materials; and construction, operation and maintenance are extremely simple.

In accordance with the above, it is an object of the present invention to provide heat storage means which is simple to construct.

Another object is to provide heat storage means that is low-cost in construction.

A further object is to provide heat storage means that provides for storage of tremendous quantities of heat for use at later times, while retaining the features of simplicity and low cost.

A further object is to provide storage means that is usable reversely, that is, to store heat, or to "store coolness," for use at later times.

A still further object is to provide such storage means, along with low-cost, effective means of getting heat (or of "getting coolness") out of the storage means in controlled quantities.

Another object is to provide a heat (or cool) storage means usable together with conventional air heating system ductwork, and cnventional air heating furnace filter and blower equipment, thereby keeping costs low, while providing auxiliary heating means.

Another object is to provide apparatus to supply fresh air to the system, and to circulate air in the basement.

Another object is to provide storage means which will give up heat as needed by the building heating system as soon as it becomes available from the solar heat collector, and which will then continue to store the excess heat all day long, and day-after-day, until a great reserve is stored.

Another object is to provide clean makeup liquid to keep the liquid (water) automatically replenished in the storage means, and to divert excess liquid from the storage means.

Other objects will become apparent as the description proceeds.

In the drawings;
FIG. 1 illustrates a basic home heating-air conditioning system utilizing the present invention.
FIG. 2 is an enlarged view of a portion of FIG. 1;
FIG. 3 is a cross-section taken along line 3—3 of FIG. 2;
FIG. 4 illustrates a modification of the present invention;
FIG. 5 is a view taken along line 5—5 of FIG. 4;
FIG. 6 illustrates details of the heat collector and dissipator manifolds;
FIG. 7 is a view of a modified form of the distributor ductwork for bringing air into the storage apparatus.

Referring more specifically to the drawings, one typical design for a solar heated-air conditioned building is illustrated in FIG. 1. Such building preferably has a south-facing solar heat collector roof 2, such as that described in my Patent No. 3,145,707 and application S.N. 391,816. Of course other solar heat collectors, or heat sources other than solar, may be used. The remaining portion of the roof structure, which is illustrated at 3, is preferably a heat dissipator to cool a fluid, such as in summertime when it is desirable to cool the building. The heat dissipator may be constructed in an inexpensive form, as particularly described and claimed in my co-pending Patent 3,254,701. FIG. 6 illustrates details of a solar heater-heat dissipator construction wherein 8 is a distributor manifold, 15 is glass, 16 is insulation and 17 is black corrugated sheet metal. Distributor manifold 8' is used to supply liquid to the heat dissipator 3.

The building has attic space 4, living quarters 5, basement 6 and closet space 7. Closet space 7 acts as a buffer zone against outside cold or hot weather.

A fluid reservoir is shown at 10, this reservoir preferably being filled with a liquid such as water, which can be heated or cooled. Multiple reservoirs may be provided if desired. If multiple reservoirs are provided, they may be connected in series, or in parallel. Inlet line 11 brings in heated fluid, from solar heat collector 2 for example. Water may be withdrawn via line 13 and recirculated through the heat collector via distributor manifold 8 for further heating. When cooling is desired, cool fluid may be brought in via inlet line 12, and this cooling fluid may be supplied from an evaporation-radiation type roof cooler as at 3, a cooling tower, a refrigeration unit, or other. If a refrigeration unit is to be used, the evaporation or cooling coil may be immersed directly in the reservoir 10, if desired. Outlet line 13' may be used to withdraw fluid from the reservoir 10, as by means of a circulating pump, to return the fluid to the cooling apparatus. When used for cooling, line 13' is preferably brought out near the top of tank 10, the return being in the bottom thereof, thus taking the warmer fluid out of the top to be cooled.

A valve 11' may be provided in return line 11 so that heated water may be taken directly from the solar heat collector for a use such as heating swimming pool water, for example.

In order to extract the heat (or coolness) from the storage area near reservoir 10, I provide a blower unit 20 having a discharge duct 21 and return 29'. This blower unit may be the conventional blower unit found in a heating furnace for example, having an air filter therein, and the furnace unit being usable as a standby heat source for extremely long periods of cloudy weather, for warming a building quickly if it has been unoccupied and is cold, or for emergency use.

Leading off from discharge duct 21 is a duct 22 which feeds into distributor manifold 23. Distributor manifold 23 extends longitudinally along storage reservoir 10, and ducts 24 extend around said reservoir and come back into manifold 25. From manifold 25, ducts 26 lead to the points of use of the heated (or cooled) air, such as outlet registers 27. Return registers are provided at 28 and ductwork may be provided from 28 via 29 to 29' if desired. However, inasmuch as basement space 6 may be substantially air tight, return ductwork may be dispensed with if desired. If fresh air from outside is desired, such may be drawn in through a damper controlled vent such as at 28'. The damper may be gravity closed and vacuum opened, or may be mechanically or power operated.

At 18 I provide a register with adjustable louvers to admit a predetermined and adjustable amount of fresh air to the system from the basement. This is desirable for several reasons. In winter, fresh air can be brought in from outside of the house by way of register 28', where the air may be extremely cold, or it may be brought in by way of register 18 from the basement where the temperature is from 50° to 60° F., thus requiring little additional heating to come up to room temperature. During the hot summer months, fresh air may be brought in by way of register 28' or by 18 at a basement temperature of about 75° F., instead of at a hot outdoor temperature, thus requiring no cooling. The amount of fresh air taken in by the system per hour will not be great and that extracted from the basement will be replaced by slight leakage which is inherent in building construction. Obviously a supply register may be provided for the basement. This latter arrangement assures circulation of air in the basement, thus warming the basement in winter and keeping the air fresh and less humid in the summer. If dehumidifying is desirable for summertime, a small dehumidifier may be placed in the basement area 6 to keep the humidity low. The dry cool basement air is drawn into the household air supply via 18 and is distributed via 20, 27 thereby helping to cool and dehumidify the living quarters also. A portion of the air from the living quarters may be returned to the basement area by a supply register as mentioned above for cooling, dehumidifying and changing the basement air.

A by-pass duct is provided at 30 extending from discharge duct 21 to manifold 25. A damper is provided at 31, and another damper may be provided at 32. If heat is needed directly from unit 20, damper 31 is opened and heated air will flow, by the path of least resistance, predominantly through by-pass 30 to manifold 25, through lines 26 and registers 27. If desirable, damper 32 may be closed to make certain that all of the heated air goes through by-pass 30. Alternatively, damper 31 may be gravity closed and damper 32 closed and opened by an electromagnet and spring. Then, when the furnace 20 cuts on to supply heat, damper 32 is closed and a buildup of air pressure in outlet 21 will open damper 31.

The building rests on footings 40, the storage bin having a floor 41, preferably of concrete. Foundation walls 42 and storage bin wall 43 support floor joists 44. The storage reservoir is lined with insulation 48 and is preferably provided with additional heat-storage means at 50. This heat storage means may be low-cost stone or gravel, containers of Glauber's salt, or other. In the areas adjacent the ductwork, as at 51, a material such as sand may be provided. These materials have desirable characteristics such as: (1) both gravel and sand are low-cost and permanent materials; (2) the sand adjacent the ductwork yields a uniform pressure upon the ductwork, thereby permitting lightweight, low-cost, thin ductwork to be used; (3) the sand helps to store heat, and transfers same to or from the ductwork readily, heat absorption and transfer being enhanced if a black coating 52 is used on the interior and/or exterior of the ductwork. Drain holes may be provided at 53 to permit escape of condensation when the apparatus is dehumidifying the air in humid weather.

In FIG. 2 a desirable arrangement of non-fluid heat-storing means 50 is illustrated. The bin is substantially filled to the top around the edges so that the stone 50, or similar type material, will absorp more heat at the upper edges of the bin. This also helps to minimize loss of heat near the upper edges. The center area of the bin is not completely filled. Therefore, the uppermost layer of the stone is dished out, i.e. higher at the periphery of the bin and lowered in the central area in a pattern resembling a saucer. This arrangement also provides crawl space in the central area of the bin at the top for work, inspections, repairs, etc inside of the bin. This desirable arrangement of stone may be used in any of the modifications. In the modification wherein a perforated inlet manifold, say of building blocks, is used at the bottom of the bin, the saucer-shaped space at the top of the stone is particularly desirable. Warm air can rise to this warm air pocket and is readily available to supply warm air to the supply ducts for the living quarters.

In FIGS. 4 and 5 I have illustrated modified apparatus for getting heat (or coolness) out of the storage bin. In this apparatus I use reservoir 10, insulation 48 and a material such as stone 50, similar to that used in the previous embodiment. I also use the filter-blower (or furnace) 20 with ductwork 21, 22, etc. However, the manifold 23' may be provided with perforations, and perforated branches 24' may be extended outwardly from manifold 23' below reservoir 10. In this modification, material such as sand may be dispensed with and the air coming into manifold 23' and branches 24' may filter out through the perforations and up through the gravel. Similar perforated ductwork may be provided above reservoir 10 at 24" and 25'. The air re-enters such ductwork to flow to the living quarters 5 which are to be heated or cooled. Or, the return ductwork may be eliminated completely, and warm air may be taken from the pressurized storage bin at any places desired. Instead of round ductwork as illustrated, other forms or shapes may be utilized to conduct the air through the storage bin. For example, concrete or cinder blocks may be aligned as illustrated in FIG. 7 such that the holes therein form the lower manifold and fluid conduits. By spacing the blocks apart slightly, the desired "perforations" are provided in the conduits and fluid can filter out and up through the storage means 50 and past reservoir 10. In this type of construction the air is filtered of dust particles, to a considerable extent, as it drifts slowly up through the stonelike material 50. However, the filter in blower unit 20 will extract substantially all dust.

Use of the roof dissipator 3 and storage drum 10 presents certain problems which are overcome by use of diverter-sediment trap 62. Dust particles from the air will settle on the heat dissipator 3. Water circulated thereover, or rain water, will wash this dust off into gutter 60. If this dust were washed directly from the dissipator, it would tend to settle out as sludge in drum 10, or even worse, it would tend to settle in line 12 and clog same. With the present diverter-trap the sediment will settle out at 64 so it can be readily removed, although removal may not be necessary for many years.

It is desirable to have the water in drum 10 automatically replenished as some of it is lost through evaporation from the heat dissipator. This is achieved by the present system including trap 62. This trap has an inlet line 61, outlet line 12 and overflow 63. The normal water level in tank 10 and in trap 62 is indicated at 65. If the apparatus has been operated for cooling for several days, the water level will be lowered somewhat. However, as soon as it rains, the water level in 10 and 62 will be restored to normal. Then, excess water from rain (snow or ice), will not overfill drum 10 or trap 62 because the excess will drain away via overflow 63. Of course trap 62 may be set at any desired elevation so as to maintain water throughout drum 10 and in pipes 11, 12 at any level desired.

Thus, it is apparent that the trap-diverter 62 performs at least three valuable functions, that is it acts as a sediment trap, and permits only clean water to enter tank 10, it automatically keeps water replenished in tank 10, whether summer or winter, and it automatically diverts excess rain water away from the system. Also, if this trap is not insulated from the cool earth, it can liberate some heat to the earth and help cool the water returning from heat dissipator 3 under some conditions. All of these advantages are obtained with the simple trap-diverter which has no moving parts or mechanical apparatus to give trouble.

When the present apparatus is used in extremely dry climates where evaporation is great and rainfall is slight, then a float-controlled valve may be used in tank 10, or in trap 62, to admit make-up water from a public water supply or well if needed. In such case, if the float-controlled inlet valve should fail to function, the overflow 63 would take care of the excess water automatically and avoid overfilling of the liquid tank and flooding of the storage bin, if tank 10 is of open-top construction. Further, a float-controlled valve may be provided in trap 62 to divert excess rain water from 61, as a substitute for overflow diverter outlet 63.

The present apparatus may be operated as follows. During the wintertime a liquid, such as water, is heated in a solar heat collector, such as collector 2. (This heat collector may be the roof of the building to be heated, may be the roof of an adjoining building, a shed-roof, or other.) The heated water flows into reservoir 10 where it gives up its heat to the stone or air and is circulated from the reservoir back to the heat collector for re-heating. Thus, the water in reservoir 10 is heated to a considerable extent within a few hours and is quickly available for use in heating air flowing through the ductwork in FIG. 1, or around drum 10 and through the stone in FIG. 5. If the heat is not needed or drawn off by air circulating in the ductwork or stone, then the heat passes into the adjacent sand and/or stone bed and is stored for later use. Insulation at 48 substantially blocks exit or heat from the warm gravel bed. Then, at night and on cloudy days, as heat is extracted via the ductwork to warm the building, heat travels back through the gravel bed, as well as from the heated reservoir of water, to the ductwork where it is taken away by air to heat the living quarters.

Now, suppose that the occupants of the home have been away on vacation and the system has not been in operation, or that some emergency arises. To heat the building quickly it is only necessary to open damper 31, and close damper 32, and start furnace 20. This makes hot filtered air available immediately through by-pass 30. Damper 31 (and damper 32) may be operated automatically by a power device when the furnace comes on if desired. Alternatively, damper 32 may be power operated and damper 31 may be gravity closed, so that when damper 32 is closed, air pressure buildup in outlet 21 will automatically force damper 31 open. If damper 32 is eliminated, substantially all warm air will flow via 30 anyway, this being the path of least resistance.

Now, for summertime use, when filtered cool air is needed, operation is as follows. The water in reservoir 10, and the bed of gravel, are cool. Hot air from the living quarters is withdrawn through registers 28 and blower inlet 29'. The air is filtered in unit 20 and expelled via 21, 22, 23, 24 and 25. The heat from the air is given up to the surrounding cool stone and the water in reservoir 10 as the air passes through the ductwork. This filtered cool air moves up through ducts 26 and may exit at 27, but preferably, registers 27 are closed for summertime operation and damper 35 is opened. The cool air then exits at 36 to drift down across the living space and cool the living quarters. Damper 35 is preferably automatically closed by gravity and opened due to pressure buildup in ducts 26 when registers 27 are closed.

When the present apparatus is being used to air-condition a building, during periods of hot weather with very high relative humidity, the moisture-laden air will strike the cool walls of the ductwork and some of the excessive moisture may condense, thus dehumidifying the air. To provide for escape of this condensation, drain holes and pipes may be provided in the ductwork, as at 53, to permit drainage. Thus, the air can be cooled, filtered, and dehumidified. However an extremely high humidity and hot weather condition seldom exists in areas of large populations. Under some conditions of slightly lower humidity and hot weather, a separate small dehumidifier may be used. Of course, in many areas no dehumidifying is needed.

As heated air is circulated through ductwork 22–26 the storage material will be heated slowly. To dissipate this heat, water from reservoir 10 is circulated to a heat dissipator and the cooled water is returned. Such heat dissipator may be a simple roof heat dissipator illustrated at 3, described in detail and claimed in my co-pending patent application S.N. 804,932 filed April 8, 1959. Such heat dissipator need be operated for only a short time each day or each night, or on occasional or alternate nights, or on the colder nights and the "cold" is stored. (Nighttime operation is preferable inasmuch as more heat is liberated per hour.)

If no cooling is required, the air may be filtered in unit 20 and circulated via by-pass 30 as previously described. Or, the system may be shut down entirely when the weather is neither too hot nor too cold and air circulation is not desired.

Among the advantages of the present invention are, tremendous heat storage capacity, minimum heat loss, low costs for materials, and simplicity and permanence of construction. The main bulk of heat storage material is stone, which is readily available at very low cost almost everywhere. The liquid heat transfer medium may be water, and such will not freeze in the solar heat collector when such collector is constructed as disclosed in my Patent No. 3,145,707 and application S.N. 391,816. The storage reservoir 10 is small and therefore inexpensive due to small size and lightweight materials which are usable in small-drum construction. The ductwork at 23, 24, 25 may be of lightweight material inasmuch as the ducts are not large, they are round, and the sand-like material exerts equal pressure on all sides. Blower-filter unit (furnace) 20 and the remainder of the ductwork may be substantially conventional as is used in most homes. The heat dissipator 3 and heat collector 2 replace the conventional roof and insulation, thereby cutting costs of the dissipator and collector.

In this system, both solar heating and air conditioning are achieved at low cost. Most of the equipment is thus usable the year around and does not deteriorate due to non-use. In spring and autumn weather, large quantities of heat are available from the heat collector and may be used for purposes such as heating swimming pool water, etc. Also, hot water may be used for many other domestic purposes. Further, in extremely hot weather, unwanted heat may be dissipated from such places as a swimming pool, etc. by way of heat dissipator 3, the cooling capacity of dissipator 3 being much greater than required for air-conditioning the home.

The ductwork at 23, 24, 25 includes hundreds of square feet of surface area. This is of great value inasmuch as the rate of heat transfer from the heat bin to the air which is circulating through the ductwork is proportional to the surface area of contact. Thus, in the present apparatus, I have provided hundreds of square feet of ductwork surface area, and this "radiator" surface is of simple low-cost construction. The importance of this tremendous "radiator" surface at low-cost is emphasized when it is considered that use of such large surface permits use of heat at a much lower temperature in the storage bin. In other words, the apparatus is still effective to heat the living quarters even when the temperature of the water, stone and sand in the heat bin is only a few degrees higher than the temperature desired in the home.

Conversely, during hot days when air conditioning is required, the temperature in the heat (or cold) storage bin need be only a few degrees below the desired room temperature. The many ducts 24 are not tiny restricted air passages, and air flows freely therethrough, thus the blower unit 20 may be of normal capacity, not requiring extra power to circulate the air.

Inasmuch as temperatures in the heat bin need not be especially high, the solar heat collector is capable of greater efficiency, and more heat is collected from the sun per day, the efficiency of such solar heat collector rising when the temperature of the fluid being circulated therethrough is not required to be high. The heat dissipator efficiency is likewise greater when the heat bin storage materials do not have to be chilled to a low temperature.

The modification of FIGS. 4 and 5 has corresponding advantages, the air being dispersed throughout the heated stone to get maximum surface contact between the warm (or cooled) stone and the air being heated (or cooled). Also, when the construction of the lower ducts is of building blocks, the cost of materials and the skill and manpower required for construction are minimized, and the upper ductwork may be eliminated if desired. The stone and drum surfaces provide thousands of square feet of heat exchange surface.

Many other uses could be mentioned for the heat or cold storage means claimed herein, and for the various parts of the system disclosed in this and my co-pending patent applications.

What I claim is:

1. Apparatus for use in heating or cooling equipment comprising a storage bin having walls, a top and a bottom, insulation means for a major portion of the walls and top and located with respect to said walls and top so as to reduce escape of heat from or entrance of heat into the storage bin, the bin containing liquid reservoir means of lesser capacity than the storage bin thus providing a space substantially surrounding the liquid reservoir means inside of the storage bin, means for selectively flowing a heated or cooled liquid into and out from said liquid reservoir means, a non-liquid heat or "cold" storage material which is non-liquid at low temperatures, located in the space and adjacent to the liquid reservoir means, the liquid reservoir means comprising a material capable of transferring heat into or out of the liquid reservoir whereby a heat transfer will take place whenever a temperature difference exists between the liquid and non-liquid material, ductwork for bringing air into the storage bin for circulation through the non-liquid storage material, the air being heated in the bin when the apparatus inside is warmer than the air, and the air being cooled in the bin when the apparatus inside is cooler than the air, and ductwork through which the heated or cooled air leaves from the storage bin.

2. Apparatus as in claim 1, said storage bin being located in a building having a basement therein, means to circulate air through said ductwork, and means to withdraw air from said basement for introduction into said ductwork.

3. Apparatus as in claim 1, said ductwork for bringing air to be heated or cooled into said storage bin having an inlet duct and a distributor manifold, a plurality of ducts leading from said distributor manifold, a filter and blower system to filter and circulate the air through said ductwork, and auxiliary heat-producing means to supply heat to said apparatus.

4. Apparatus as in claim 3, said plurality of ducts extending around said liquid reservoir means.

5. Apparatus as in claim 4, and means to introduce fresh air into said ductwork, said ducts which extend around said liquid reservoir means being subject to external pressure from said non-liquid material, said non-liquid material being in granular form at least in the areas adjacent to said ductwork to exert substantially uniform pressure on said ductwork.

6. Apparatus as in claim 5, and a perforation at a low point in said ductwork to permit escape of condensed vapor.

7. Apparatus as in claim 1, said first mentioned ductwork comprising blocks of material placed in said storage bin in such manner as to provide air passageways for distribution of the air into and in spaces among the non-liquid heat or "cold" storage material.

8. Apparatus for use in heating or cooling equipment comprising a storage bin having walls, insulation material adjacent the walls of a major portion of said storage bin to retard escape of heat from or entrance of heat into said storage bin, said bin containing fluid reservoir means for enclosing a heated or cooled fluid, means for selectively heating or cooling fluid in said fluid reservoir means, said fluid reservoir means comprising a material capable of transferring heat into or out of said fluid reservoir means, heat or "cold" storage material which is non-fluid at low temperatures in said bin and in proximity to said fluid reservoir means so that a heat transfer will take place whenever there is a temperature difference between the fluid and the non-fluid material, said non-fluid material and said fluid reservoir means having large areas of surface exposed to air in said storage bin whereby large quantities of heat may be transferred among the various materials and air in said storage bin whenever a temperature difference exists among the materials or between the materials and the air, ductwork comprising a plurality of fluid conduits in said storage bin, said fluid conduits having conduit means connected therewith and extending to the inside of the storage bin from a location outside of the storage bin so that air to be heated or cooled may be introduced into said plurality of fluid conduits, said fluid conduits having openings to permit air being introduced through said conduit means and said fluid conduits to escape into said storage bin and directly into said non-fluid material whereby such air may pass in spaces through said non-fluid material and around said fluid reservoir such that the air temperature will be raised or lowered by the warmed or cooled apparatus in said storage bin, and means, leading from a location inside of said storage bin to a location outside of said storage bin, through which air which has been warmed or cooled may flow to the outside of said storage bin.

9. Apparatus as set forth in claim 8, said non-fluid material being placed in said storage bin to a high level adjacent the peripheral walls of said storage bin and to a lower level in the central area of said storage bin, thus providing crawl-space between the top of the bin and the non-fluid material for installation, inspection and repair of apparatus in said storage bin.

10. Apparatus as set forth in claim 8, said fluid in said reservoir being a liquid, means to introduce makeup liquid to said reservoir and to prevent filling of said reservoir above a desired level, and means to prevent entrance of sediment or trash into said reservoir.

11. Apparatus as set forth in claim 8, filter means in said ductwork to filter the air being circulated therethrough, auxiliary heat-producing means connected to said ductwork, and bypass duct and damper means to permit the flow of air to bypass said fluid conduits which have openings therein.

12. Apparatus for use in heating or cooling equipment comprising a storage bin having walls, a top and a bottom, insulation means adjacent to said walls and top to reduce transfer of heat to or from said storage area, said storage area having a storage tank therein for containing a liquid such as water, said storage tank comprising a heat conducting material, said storage tank being smaller in size than said storage area leaving a space around said storage tank inside of said storage area, said space containing stones, perforated fluid conduit means adjacent to the bottom of the storage area, said perforated fluid conduit comprising pieces of masonry placed with spaces therebetween serving as perforations in said fluid conduit means, means for selectively flowing a heated or cooled liquid into and out from said storage tank to thereby heat or cool said storage tank and the stones therearound, means to introduce air to be heated or cooled to said perforated fluid conduit means and directly into said stones so that the air may circulate through and around the warmed or cooled stones and storage tank to thereby warm or cool the air.

13. Apparatus for use in heating or cooling equipment comprising a storage bin having walls, insulating means in proximity to said walls to retard flow of heat from or to said storage bin, means in said storage bin to store heat or "coolers," means to introduced a fluid, such as air, to said bin to be heated or cooled, perforated conduits in said storage bin to distribute said fluid to the means to store heat or "coolness," said perforated conduits comprising pieces of masonry placed in said storage bin with spaces between adjacent pieces of masonry, said spaces serving as perforations in said conduits so that the fluid coming through said ducts may pass directly into the means to store heat whereby said fluid will be heated when the temperature of the means to store heat exceeds the temperature of the fluid to be heated, and duct means leading from said storage bin to permit fluid in said storage bin to pass therefrom as additional fluid is introduced.

14. Apparatus for use in heating equipment comprising a storage bin having walls, a top and a bottom, insulation means for a major portion of the walls and top and located with respect to said walls and top so as to reduce escape of heat from the storage bin, the bin containing liquid reservoir means of lesser capacity than the storage bin thus providing a space substantially surrounding the liquid reservoir means inside of the storage bin, means for heating the liquid in said liquid reservoir means, a non-liquid heat storage material which is non-liquid at low temperatures located in the space and adjacent to the liquid reservoir means, the liquid reservoir means comprising a material capable of transferring heat out of the liquid reservoir whereby a heat transfer will take place whenever a temperature difference exists between the liquid and non-liquid material, an opening in the storage bin for bringing air into the storage bin for circulation through the non-liquid storage material, the air being heated in the bin when the apparatus inside is warmer than the air, and an opening in the storage bin through which the heated air leaves from the storage bin.

15. Apparatus for use in heating equipment comprising a storage bin having walls, insulation material adjacent the walls of a major portion of said said storage bin to retard escape of heat from said storage bin, said bin containing fluid reservoir means for enclosing a heated fluid, means for heating the fluid in said fluid reservoir means, said fluid reservoir means comprising a material capable of transferring heat out of said fluid reservoir means, heat storage material, which is non-fluid at low temperatures, in said bin and in proximity to said fluid reservoir means so that a heat transfer will take place whenever there is a temperature difference between the fluid and the non-fluid material, said non-fluid material and said fluid reservoir means having large areas of surface exposed to air in said storage bin whereby large quantities of heat may be transferred among the various materials and air in said storage bin whenever a temperature difference exists among the materials or between the materials and the air, ductwork comprising a plurality of fluid conduits in said storage bin, said fluid conduits having conduit means connected therewith and extending to the inside of the storage bin from a location outside of the storage bin so that air to be heated may be introduced into said plurality of fluid conduits, said fluid conduits having openings to permit air being introduced through said conduit means and said fluid conduits to escape into said storage bin and directly into said non-fluid material whereby such air may pass in spaces through said non-fluid material and around said fluid reservoir such that the air temperature will be raised by the warmed apparatus in said storage bin, and means, leading from a location inside of said storage bin to a location outside of said storage bin, through which air has been warmed may flow to the outside of said storage bin.

References Cited by the Examiner
UNITED STATES PATENTS

| | | | |
|---|---|---|---|
| 358,065 | 2/1887 | O'Brien et al. | 126—118 |
| 965,391 | 7/1910 | Little | 237—1 |
| 1,400,815 | 12/1921 | Hagen | 165—103 |
| 1,637,166 | 7/1927 | Ullin | 34—224 X |
| 1,649,482 | 11/1927 | Metzger et al. | 165—133 |
| 1,766,742 | 6/1930 | Campbell | 34—232 X |
| 1,823,661 | 9/1931 | O'Brien | 165—103 |
| 2,137,841 | 11/1938 | Hutchings | 165—133 X |
| 2,170,991 | 8/1939 | Grady | 165—18 |
| 2,247,304 | 6/1941 | Mela | 219—34.24 |
| 2,343,211 | 2/1944 | Newton | 165—18 |
| 2,396,338 | 3/1946 | Newton | 165—18 |
| 2,559,869 | 7/1951 | Gay | 237—1 |
| 2,660,863 | 12/1953 | Gerhart | 62—179 |
| 2,723,083 | 11/1955 | Bary | 165—29 X |
| 2,817,217 | 12/1957 | Winkler et al. | 62—259 |
| 2,856,506 | 10/1958 | Telkes | 126—400 |
| 3,169,382 | 2/1965 | Brown | 62—259 |

ROBERT A. O'LEARY, *Primary Examiner.*

HERMAN BERMAN, HERBERT L. MARTIN, CHARLES SUKALO, *Examiners.*

R. F. BURNETT, FREDERICK L. MATTESON, JR.,
*Assistant Examiners.*